United States Patent
Lee et al.

(10) Patent No.: US 9,210,400 B2
(45) Date of Patent: Dec. 8, 2015

(54) METHOD AND IMAGE PROCESSING DEVICE FOR ADJUSTING STEREO IMAGE

(71) Applicants: Tung-Ying Lee, Kaohsiung (TW); Ming-Hsuan Lin, New Taipei (TW); Shang-Hong Lai, Hsinchu (TW); Ming-Feng Chiang, Miaoli County (TW)

(72) Inventors: Tung-Ying Lee, Kaohsiung (TW); Ming-Hsuan Lin, New Taipei (TW); Shang-Hong Lai, Hsinchu (TW); Ming-Feng Chiang, Miaoli County (TW)

(73) Assignees: Novatek Microelectronics Corp., Hsinchu (TW); National Tsing Hua University, Hsinchu (TW)

( * ) Notice: Subject to any disclaimer, the term of this patent is extended or adjusted under 35 U.S.C. 154(b) by 256 days.

(21) Appl. No.: 13/913,533

(22) Filed: Jun. 10, 2013

(65) Prior Publication Data

US 2014/0160113 A1  Jun. 12, 2014

(30) Foreign Application Priority Data

Dec. 10, 2012 (TW) .............................. 101146416 A (51) Int. Cl.
G06T 15/00  (2011.01)
H04N 13/00  (2006.01)
G06T 7/00  (2006.01)

(52) U.S. Cl.
CPC .......... *H04N 13/0022* (2013.01); *G06T 7/0075* (2013.01); *H04N 2013/0081* (2013.01)

(58) Field of Classification Search
None
See application file for complete search history.

(56) References Cited

U.S. PATENT DOCUMENTS

2012/0262543 A1  10/2012  Lee et al.

FOREIGN PATENT DOCUMENTS

| CN | 101282492 | 10/2008 |
|---|---|---|
| CN | 102422644 | 4/2012 |
| CN | 102625120 | 8/2012 |
| CN | 102714751 | 10/2012 |
| CN | 102802008 | 11/2012 |

OTHER PUBLICATIONS

Thimbleby, Using surface curvature and topological features from shape-from-shading to improve shape-from-stereo, Mar. 13, 2003.*

(Continued)

*Primary Examiner* — Yingchun He
(74) *Attorney, Agent, or Firm* — Jianq Chyun IP Office (57) ABSTRACT

A method and an image processing device for adjusting a stereo image are provided. The method includes: obtaining a disparity map between a first image and a second image; dividing the disparity map into layers which correspond to first layers of the first image and second layers of the second image; generating a first cost according to displacements of pixels of an $i^{th}$ first layer and an $i^{th}$ second layer; generating a second cost according to a difference between displacements of pixels of the $i^{th}$ first layer and a $j^{th}$ first layer, and a difference between displacements of pixels of the $i^{th}$ second layer and a $j^{th}$ second layer; executing an optimization algorithm at least according to the first cost and the second cost to obtain all the displacements; and adjusting the positions of the corresponding pixels according to the displacements. Therefore, a viewer may have a better viewing experience.

16 Claims, 5 Drawing Sheets

(56) References Cited

OTHER PUBLICATIONS

Bleyer et al., A layered stereo matching algorithm using image segmentation and global visibility constraints, ISPRS Journal of Photogrammetry & Remote Sensing 59 (2005) p. 128-150.*

Hirschmuller et al., Evaluation of Stereo Matching Costs on Images with radiometric Differences, IEEE Transactions on Pattern Analysis and Machine Intelligence, vol. 31, No. 9 Sep. 2009.*

Graham Jones et al., "Controlling Perceived Depth in Stereoscopic Images," SPIE Proceedings, vol. 4297, Jan. 20, 2001, pp. 1-12.

Geng Sun and Nick Holliman, "Evaluating Methods for Controlling Depth Perception in Stereoscopic Cinematography," SPIE Proceedings, vol. 7237, Jan. 18, 2009, pp. 1-12.

Manuel Lang et al., "Nonlinear Disparity Mapping for Stereoscopic 3D," Proceedings of ACM SIGGRAPH, vol. 29, Issue 4, Jul. 2010, pp. 1-10.

Che-Han Chang et al., "Content-Aware Display Adaptation and Interactive Editing for Stereoscopic Images," IEEE Transactions on Multimedia, vol. 13, Issue 4, Aug. 2011, pp. 1-10.

Hischmiller et al. "Evaluation of Cost Functions for Stereo Matching," IEEE Conference on Computer Vision and Pattern Recognition, Jun. 17-22, 2007, pp. 1-8.

HaCohen Yoav et al., "Non-Regid Dense Correspondence with Applications for Image Enhancement," Proceedings of ACM SIGGRAPH, vol. 30, Issue 4, Jul. 2011, pp. 1-9.

Dorin Comaniciu and Peter Meer, "Mean Shift: A Robust Approach Toward Features Space Analysis," IEEE Transactions on Pattern Analysis and Machine Intelligence, vol. 24, No. 5, May 2002, pp. 1-17.

Frank L. Kooi and Marcel Lucassen, "Visual comfort of binocular and 3-D displays," Displays, vol. 25, Issues 2-3, Aug. 2004, pp. 1-17.

Gunhee Kim and Eric P. Xing, "On Multiple Foreground Cosegmentation," IEEE Conference on Computer Vision and Pattern Recognition (CVPR), Jun. 16-21, 2012, pp. 1-8.

Vladimir Kolmogorov and Ramin Zabih, "Multi-camera Scene Reconstruction via Graph Cuts," Computer Vision, vol. 2352, May 28-31, 2002, pp. 1-16.

Chun-Wei Liu et al., "3D Cinematography Principles and Their Applications to Stereoscipic Media Processing," Proceedings of the 19th ACM international conference on Multimedia, Nov. 2011, pp. 1-10.

Yin Li et al., "Lazy snapping," Microsoft Research, Apr. 2004, pp. 1-6.

Bernard Mendiburu, "3D Movie Making: Stereoscopic Digital Cinema from Script to Screen," Focal Press, Apr. 22, 2009, pp. 1-232.

Nobuyuki Otsu, "A Threshold Selection Method from Gray-Level Histogram," IEEE transactions on Systems, Man and Cybernetics, vol. 9, Issue 1, Jan. 1979, pp. 1-5.

Carsten Rother et al., "GrabCut- Interactive Foreground Extraction using Iterated Graph Cuts," ACM Transactions on Graphics (SIGGRAPH), Aug. 2004, pp. 1-6.

Smolic et al. "Three-Dimensional Video Postproduction and Processing," Proceedings of the IEEE, vol. 99, No. 4, Apr. 2011, pp. 607-625.

Jian Sun et al., "Symmetric Stereo Matching for Occlusion Handling," IEEE Computer Society Conference on Computer Vision and Pattern Recognition, vol. 2, Jun. 20-25, 2005, pp. 1-8.

Jianbo Shi and Jitendra Malik, "Normalized Cuts and Image Segmentation," IEEE Transactions on Pattern Analysis and Machine Intelligence, vol. 22, No. 8, Aug. 2000, pp. 1-18.

W. Blohm et al., Abstract of "Stereoscopic image representation with synthetic depth of field," Journal of the Society for Information Display, vol. 5, Issue 3, Sep. 1997, pp. 1-2.

A. Criminisi, P. Perez and K. Toyama, "Object Removal by Exemplar-Based Inpainting," IEEE Computer Vision and Pattern Recognition, Jun. 2003, pp. 1-8.

Dhruv Batra et al., "iCoseg: Interactive Co-segmentation with Intelligent Scribble Guidance," IEEE Conference on Computer Vision and Pattern Recognition (CVPR), Jun. 13-18, 2010, pp. 1-8.

"Office Action of China Counterpart Application," issued on Jun. 17, 2015, p. 1-p. 5.

* cited by examiner

METHOD AND IMAGE PROCESSING DEVICE FOR ADJUSTING STEREO IMAGE

CROSS-REFERENCE TO RELATED APPLICATION

This application claims the priority benefit of Taiwan application serial no. 101146416, filed on Dec. 10, 2012. The entirety of the above-mentioned patent application is hereby incorporated by reference herein and made a part of this specification.

BACKGROUND

1. Technical Field

The invention relates to an adjusting method for adjusting a stereo image and particularly relates to an adjusting method and an image processing device using an optimization algorithm.

2. Description of Related Art

A stereo image is composed of images of two or more different viewing angles. A stereo image display displays an image of one viewing angle to the left eye of the viewer and displays an image of another viewing angle to the right eye of the viewer, for the brain of the viewer to create a three-dimensional image. However, the images of different viewing angles are displayed on a planar screen. Thus, the eyes of the viewer are focused on the screen, and the three-dimensional image created by the brain is before or behind the screen. Such a situation may cause the viewer to feel uncomfortable or dizzy. Generally speaking, the viewer may experience the aforementioned uncomfortable situation when the created image is too far away from the screen.

Figure 1:
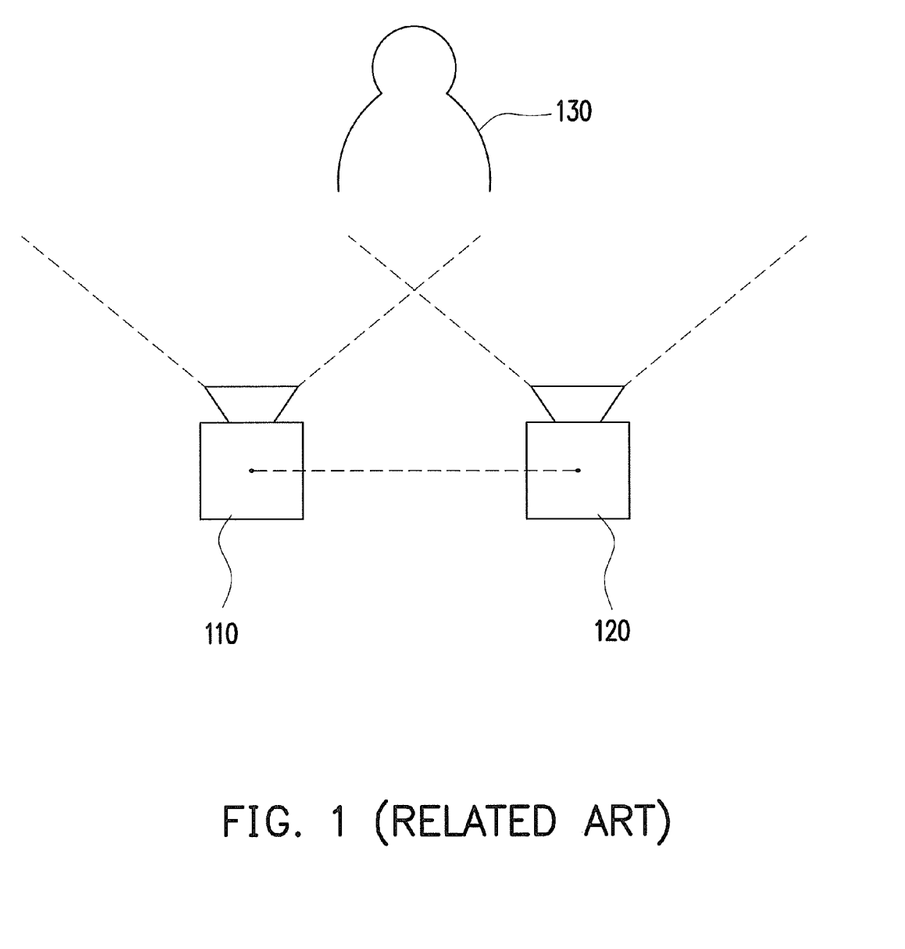
FIG. 1 is a schematic view illustrating the capture of a stereo image.

FIG. 1 is a schematic view illustrating the capture of a stereo image.

Referring to FIG. 1, there is a distance between video cameras 110 and 120, and the video cameras 110 and 120 capture the images of an object 130 at the same time. The images taken by the video cameras 110 and 120 form the stereo image. Because the distance between the video cameras 110 and 120 is fixed, when the stereo image is displayed on a large-sized screen, the three-dimensional image created by the brain may be too far away from the screen.

Considering the above, how to adjust the stereo image to provide the viewer a better viewing experience is an important issue in this field.

SUMMARY

An embodiment of the invention provides an adjusting method and an image processing device for adjusting a stereo image for giving a viewer a better viewing experience.

An embodiment of the invention provides an adjusting method for adjusting a stereo image, adapted for an image processing device. The adjusting method includes: obtaining a disparity map between a first image and a second image, wherein a viewing angle of the first image is different from a viewing angle of the second image, and the disparity map includes a plurality of disparity values; dividing the disparity map into a plurality of layers according to the disparity values, wherein the layers correspond to a plurality of first layers of the first image and a plurality of second layers of the second image; generating a first difference according to a displacement of a pixel of an $i^{th}$ first layer and a displacement of a pixel of an $i^{th}$ second layer in an x direction, and generating a first cost according to the first difference, wherein i is a positive integer; and generating a second cost according to a difference between the displacement of the pixel of the $i^{th}$ first layer and a displacement of a pixel of a $j^{th}$ first layer in the x direction, and a difference between the displacement of the pixel of the $i^{th}$ second layer and a displacement of a pixel of a $j^{th}$ second layer in the x direction. Herein, j is a positive integer different from i. The adjusting method further includes: executing an optimization algorithm at least according to the first cost and the second cost to obtain the displacement of the pixel of the $i^{th}$ first layer and the displacement of the pixel of the $i^{th}$ second layer in the x direction; and adjusting a position of the pixel of the $i^{th}$ first layer according to the displacement of the pixel in the x direction and adjusting a position of the pixel of the $i^{th}$ second layer according to the displacement of the pixel in the x direction.

In an embodiment, a step of dividing the disparity map into the layers according to the disparity values includes: executing a mean-shift algorithm, a normalized cuts algorithm, or a random walker segmentation algorithm according to the disparity values to divide the disparity map into the layers.

In an embodiment, the step of dividing the disparity map into the layers according to the disparity values includes: dividing the disparity map into the layers according to a plurality of similarities between the disparity values. The similarities are calculated based on two locations of two of the disparity values, neighboring color information of the two locations, or the disparity values corresponding to the two locations.

In an embodiment, the first difference is a difference between the displacement of the pixel of the $i^{th}$ first layer and the displacement of the pixel of the $i^{th}$ second layer in the x direction. A step of generating the first cost includes: generating the first cost according to the first difference, a mean of the disparity values corresponding to the $i^{th}$ first layer, and a mean of the disparity values corresponding to the $i^{th}$ second layer.

In an embodiment, the first difference is a difference between a position of the pixel of the $i^{th}$ first layer and a position of the pixel of the $i^{th}$ second layer in the x direction after the pixels are displaced. The step of generating the first cost further includes: increasing the first cost if the first difference is smaller than a first predetermined value; and increasing the first cost if the first difference is larger than a second predetermined value. Herein, the first predetermined value and the second predetermined value are set according to a screen width.

In an embodiment, the adjusting method further includes: obtaining a second difference between a displacement of an $i+1^{th}$ first layer and a displacement of an $i+1^{th}$ second layer; and generating a third cost according to a difference between the second difference and a difference between a shift of the pixel of the $i^{th}$ first layer and a shift of the pixel of the $i^{th}$ second layer in the x direction. Herein, a step of executing the optimization algorithm at least according to the first cost and the second cost includes: executing the optimization algorithm according to the first cost, the second cost, and the third cost.

In an embodiment, the adjusting method further includes: generating a fourth cost according to a third difference between a position of the pixel of the $i^{th}$ first layer and a position of the pixel of the $i^{th}$ second layer in the y direction after the pixels are displaced.

In an embodiment, the adjusting method further includes: generating a fifth cost according to a displacement of an $n^{th}$ first layer, wherein n is a positive integer. Herein, the step of executing the optimization algorithm at least according to the first cost and the second cost includes: executing the optimization algorithm according to the first cost, the second cost, the third cost, the fourth cost, and the fifth cost, so as to obtain the displacements of the pixels of the $i^{th}$ first layer and the $i^{th}$ second layer in the x direction and the y direction. The adjusting method further includes: adjusting the position of the pixel of the $i^{th}$ first layer according to the displacement of the pixel in the y direction, and adjusting the position of the pixel of the $i^{th}$ second layer according to the displacement of the pixel in the y direction.

From another aspect, an embodiment of the invention provides an image processing device, including a memory and a processor. The memory stores a plurality of commands therein. The processor is coupled to the memory for executing the commands to execute a plurality of steps: obtaining a disparity map between a first image and a second image, wherein a viewing angle of the first image is different from a viewing angle of the second image, and the disparity map includes a plurality of disparity values; dividing the disparity map into a plurality of layers according to the disparity values, wherein the layers correspond to a plurality of first layers of the first image and a plurality of second layers of the second image; generating a first difference according to a displacement of a pixel of an $i^{th}$ first layer and a displacement of a pixel of an $i^{th}$ second layer in an x direction, and generating a first cost according to the first difference, wherein i is a positive integer; and generating a second cost according to a difference between the displacement of the pixel of the $i^{th}$ first layer and a displacement of a pixel of a $j^{th}$ first layer in the x direction, and a difference between the displacement of the pixel of the $i^{th}$ second layer and a displacement of a pixel of a $j^{th}$ second layer in the x direction. Herein, j is a positive integer different from i. The steps further include: executing an optimization algorithm at least according to the first cost and the second cost to obtain the displacement of the pixel of the $i^{th}$ first layer and the displacement of the pixel of the $i^{th}$ second layer in the x direction; and adjusting a position of the pixel of the $i^{th}$ first layer according to the displacement of the pixel in the x direction and adjusting a position of the pixel of the $i^{th}$ second layer according to the displacement of the pixel in the x direction.

Based on the above, the adjusting method and the image processing device in the embodiments of the invention adjust positions of the pixels through the optimization algorithm such that the image integrated by the brain can fall in a proper area.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

First Embodiment

Figure 2:
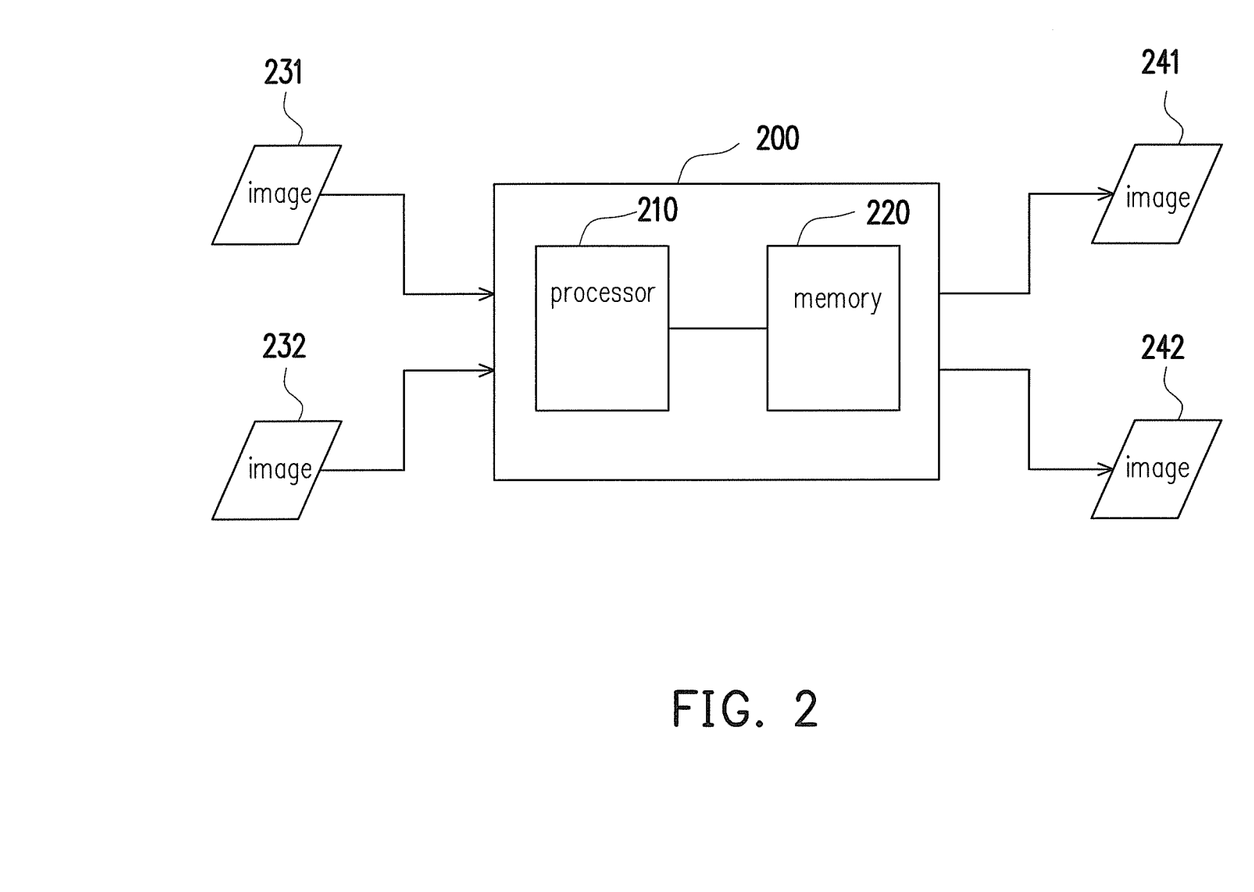
FIG. 2 is a block diagram illustrating an image processing device according to the first embodiment of the invention.

FIG. 2 is a block diagram illustrating an image processing device according to the first embodiment of the invention.

Referring to FIG. 2, an image processing device 200 includes a processor 210 and a memory 220. For example, the image processing device 200 may be embodied in the form of a computer, a server, a distributed system, a television, a smart phone, a tablet computer, or any kind of embedded system.

The processor 210 is configured for executing one or more commands. For example, the processor 210 may be a central processing unit (CPU), a microprocessor, or a digital signal processor (DSP), etc.

The memory 220 is used for storing data and commands. The memory 220 may be a random access memory, a flash memory, or other kinds of memories, for example.

In this embodiment, the memory 220 stores a plurality of commands therein, and the processor 210 executes the commands to receive images 231-232 and output images 241-242. The images 231-232 form a stereo image. That is, a viewing angle of the image 231 is different from a viewing angle of the image 232. For example, the image 231 represents an image for the left eye (i.e. first image) and the image 232 represents an image for the right eye (i.e. second image). The processor 210 adjusts the positions of a plurality of pixels of the images 231-232 to generate the images 241-242 that are to be displayed on a stereo display.

Figure 3:
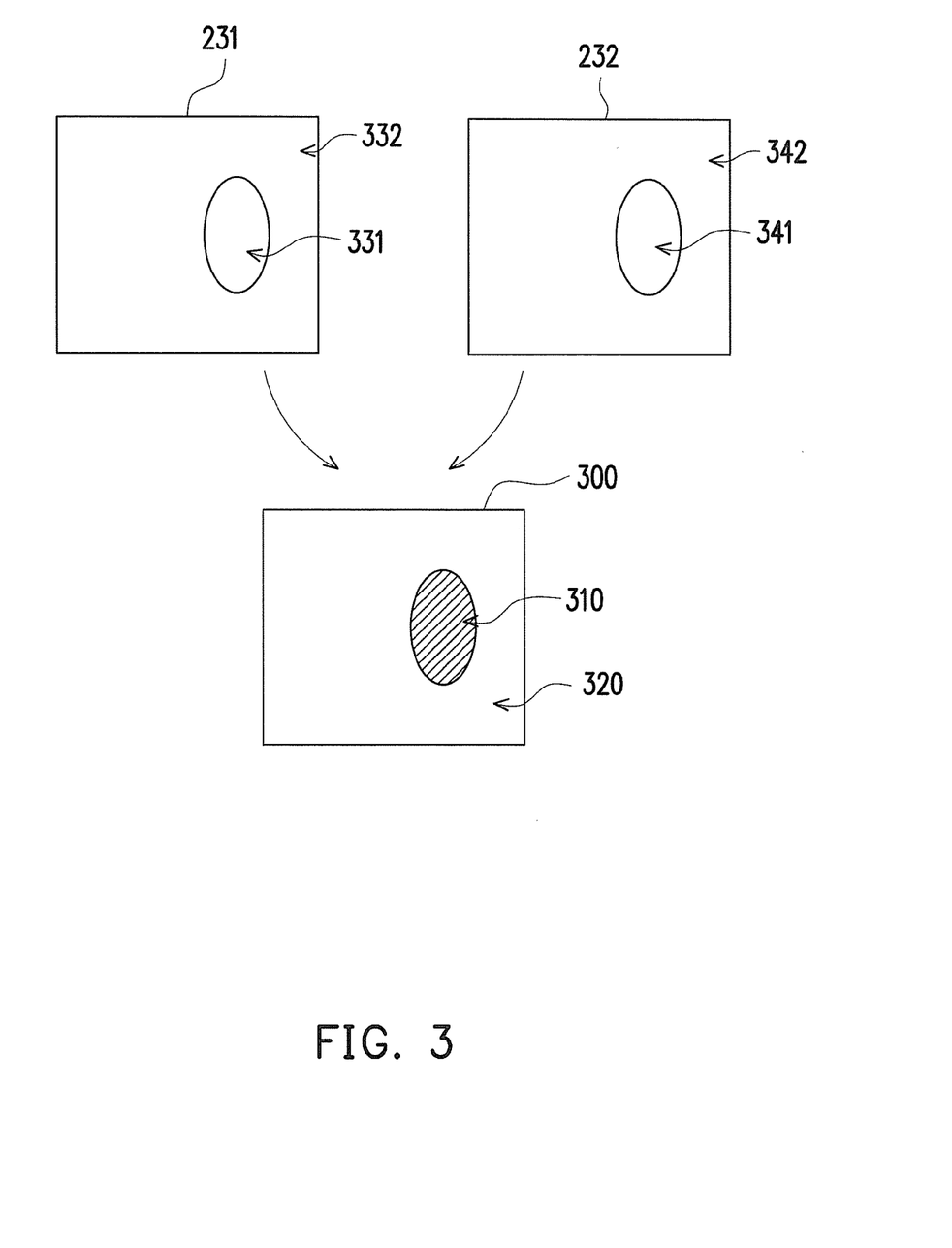
FIG. 3 illustrates dividing a disparity map into multiple layers according to the first embodiment of the invention.

FIG. 3 illustrates dividing a disparity map into multiple layers according to the first embodiment of the invention.

Referring to FIG. 3, the processor 210 first obtains a disparity map 300 between the images 231 and 232. For example, the processor 210 obtains a pixel of the image 231, and this pixel corresponds to a pixel of the image 232. The processor 210 generates a disparity value according to the positions of the two pixels, and the disparity value represents a depth of an object. The processor 210 obtains the disparity value corresponding to each pixel of the image 231, so as to generate the disparity map 300. In other words, in this embodiment, the disparity map 300 corresponds to the image 231 and includes depth information of the image 231. However, in other embodiments, the disparity map 300 may correspond to the image 232 and include depth information of the image 232, but the invention is not limited thereto.

Next, the processor 210 divides the disparity map 300 into a plurality of layers according to the disparity values of the disparity map 300, and each of the layers represents different depths. For instance, the processor 210 executes a mean-shift algorithm, a normalized cuts algorithm, or a random walker segmentation algorithm according to the disparity values to divide the disparity map 300 into the layers.

Take the mean-shift algorithm as an example, the processor 210 sets a plurality of starting points in the disparity map 300 and executes the mean-shift algorithm for each of the starting points according to the disparity values of the disparity map 300, so as to obtain a plurality of end points. The mean-shift algorithm is to move a short distance each time starting from the starting point according to a kernel or filter and finally stop at a position of the disparity map 300 where the disparity value is relatively smaller or greater. The final position is the end point. Generally speaking, paths from the multiple starting points in one object end near the same end point, and the processor 210 divides the disparity map 300 into multiple layers according to the obtained end points. For example, the disparity map 300 is divided into a layer 310 and a layer 320.

However, in other embodiments, the processor 210 may calculate a similarity between every two locations (i.e. every two disparity values) and divide the disparity map 300 into multiple layers according to the similarities. The similarity is calculated based on the two locations, neighboring color information of the two locations, or the disparity values corresponding to the two locations. Specifically, as two disparity values associated to two locations on the disparity map approximate to each other, the similarity between the two locations becomes larger. Alternatively, as the two locations are close to each other, the similarity between the two locations becomes larger. On the other hand, the color information (i.e. luminance or chrominance) near a location corresponding to the image 231 or 232 is the neighboring color information of the location. As the neighboring color information of two locations approximates to each other, the similarity between the two locations becomes larger. The neighborhood may be defined by the distance between two locations, or be defined by a Markov random field; however, the invention is not limited thereto. As the similarity between two locations increases, the two locations become more likely to be divided into the same layer. However, the processor 210 may use other image segmentation and clustering algorithms to obtain the multiple layers. The algorithms used for obtaining the layers or the number of the layers of the invention should not be limited to the above disclosure.

The processor 210 obtains layers corresponding to the images 231-232 based on the layers of the disparity map 300. For example, in the image 231, a layer 331 corresponds to the layer 310 and a layer 332 corresponds to the layer 320. In the image 232, a layer 341 corresponds to the layer 310 and a layer 342 corresponds to the layer 320. Herein, the layers 331-332 of the image 231 are also called first layers and the layers 341-342 of the image 232 are also called second layers.

In this embodiment, the processor 210 changes positions of the pixels of the images 231-232 with each layer as a unit. That is, all the pixels of one layer are displaced for the same distance. Moreover, the processor 210 sets the displacement of each layer as a variable, generates a plurality of costs according to the variables, and executes an optimization algorithm according to the costs, thereby calculating values of the variables.

More specifically, the processor 210 generates a first difference according to a displacement of a pixel of an $i^{th}$ first layer of the first layers 331-332 in an x direction and a displacement of a pixel of an $i^{th}$ second layer of the second layers 341-342 in the x direction, and generates a first cost according to the first difference, wherein i is a positive integer. Herein, the $i^{th}$ first layer and the $i^{th}$ second layer correspond to the same layer of the disparity map 300. In the first embodiment, the first difference refers to the difference between the displacement of the pixel of the $i^{th}$ first layer and the displacement of the pixel of the $i^{th}$ second layer in the x direction, but the invention is not limited thereto. In another embodiment, the first difference may refer to a difference between a position of the pixel of the $i^{th}$ first layer and a position of the pixel of the $i^{th}$ second layer in the x direction after the pixels are displaced. When the first difference is very large (or very small), it indicates that the first cost is increased in the case that the displaced first and second images are integrated by the brain at a position very far away from a screen.

In an embodiment, the processor 210 generates the first cost according to the first difference, a mean of the disparity values corresponding to the $i^{th}$ first layer, and a mean of the disparity values corresponding to the $i^{th}$ second layer. In addition, if the displacements of all the pixels of the $i^{th}$ first layer (or second layer) in the x direction are equal, the displacement of one layer in the x direction may represent the displacements of all the pixels therein. For example, the first cost may be represented by the following formula (1).

$$E_{range} = \sum_i |m(L_i) + x_{L,i} - x_{R,i}| + \sum_i |m(R_i) + x_{L,i} - x_{R,i}| \qquad (1)$$

$E_{range}$ represents the first cost. $L_i$ represents the $i^{th}$ first layer, and $R_i$ represents the $i^{th}$ second layer. $x_{L,i}$ represents a shift of the $i^{th}$ first layer in the x direction. $x_{R,i}$ represents a shift of the $i^{th}$ second layer in the x direction. It should be noted that "shift" refers to a distance for which one pixel (or layer) is moved in a certain direction without being rotated. "Displacement" refers to a distance for which one pixel is moved through rotation (or other linear transformation) and shift. In the first embodiment, rotation of the images is not taken into consideration, and thus "shift" is equal to "displacement." $m(L_i)$ represents the mean of the disparity values (e.g. the disparity values of the layer 310) corresponding to the $i^{th}$ first layer. $m(R_i)$ represents the mean of the disparity values corresponding to the $i^{th}$ second layer. In the formula (1), the first cost is calculated using an absolute error; however, the invention is not limited thereto. In other embodiments, a root-mean-square error or other types of errors may be used.

On the other hand, the processor 210 generates a second cost according to a difference between the displacement of the $i^{th}$ first layer and a displacement of a $j^{th}$ first layer in the x direction and a difference between the displacement of the $i^{th}$ second layer and a displacement of a $j^{th}$ second layer in the x direction. Herein, j is a positive integer different from i. The second cost indicates that, when the displacements of the $i^{th}$ first layer and the $j^{th}$ first layer in the x direction are too large, the adjusted first image has a lot of holes (the holes have no pixel value), and therefore the processor 210 increases the second cost. Likewise, when the displacements of the $i^{th}$ second layer and the $j^{th}$ second layer in the x direction are too large, the adjusted second image has a lot of holes, and thus the processor 210 increases the second cost. In an embodiment, the second cost may be represented by the following formula (2).

$$E_{hole} = \sum_{i=1}^{N} \sum_{j=i+1}^{N} |x_{L,i} - x_{L,j}| + \sum_{i=1}^{N} \sum_{j=i+1}^{N} |x_{R,i} - x_{R,j}| \qquad (2)$$

N represents the number of the layers (equal to the number of the first layers and the number of the second layers). The formula (2) uses the absolute error, but the invention is not limited thereto. In other embodiments, the root-mean-square error or other types of errors may be used.

The processor 210 executes the optimization algorithm at least according to the first cost and the second cost, so as to obtain the displacements of the $i^{th}$ first layer and the $i^{th}$ second layer in the x direction. However, in this embodiment, the processor 210 further obtains a second difference between a shift of an $i+1^{th}$ first layer and a shift of an $i+1^{th}$ second layer in the x direction. Furthermore, the processor 210 generates an objective function according to the difference (i.e. the first difference in this embodiment) between the shifts of the pixels of the $i^{th}$ first layer and the $i^{th}$ second layer in the x direction and the second difference. The processor 210 also executes the optimization algorithm according to the objective function. In this embodiment, the optimization algorithm may be represented by the following formula (3).

$$\min \quad E_{Range} + \lambda E_{hole} \qquad (3)$$
$$\text{s.t.} \quad x_{L,i} - x_{R,i} \geq x_{L,i+1} - x_{R,i+1} + \beta, x_{L,N} = 0$$

The first difference ($x_{L,i}$–$x_{R,i}$) is on the left of the objective function, and the second difference ($x_{L,i+1}$–$x_{R,i+1}$) and a variable $\beta$ are on the right of the objective function. Herein, the variable $\beta$ is a real number, which is determined by a user. $\lambda$ is a real number, which may also be determined by the user. In this embodiment, the layers are arranged according to the depths thereof. Therefore, visually the $i^{th}$ layer is before the $i+1^{th}$ layer. For all the $i^{th}$ layers, the first difference has to be larger than the second difference; otherwise, the $i^{th}$ layer will be displayed after the $i+1^{th}$ layer after displacement. In addition, a displacement of an $N^{th}$ first layer is set to 0, such that the optimization algorithm has only one solution, but the invention is not limited thereto. In other embodiments, the displacement of one of the first layers or one of the second layers may be set as 0.

After executing the optimization algorithm according to the formula (3), the processor 210 obtains a shift $x_{L,i}$ (i.e. displacement) of the $i^{th}$ first layer in the x direction and a shift $x_{R,i}$ (i.e. displacement) of the $i^{th}$ second layer in the x direction. The processor 210 adjusts the positions of the pixels of the $i^{th}$ first layer according to the shift $x_{L,i}$ and adjusts the positions of the pixels of the $i^{th}$ second layer according to the shift $x_{R,i}$. After adjusting the positions of all the pixels of the first layer and the second layer, the processor 210 obtains the images 241-242.

Second Embodiment

The second embodiment is similar to the first embodiment, and therefore only the difference is described hereinafter. In the first embodiment, the processor 210 calculates the displacement of each first layer (or second layer) in the x direction without taking rotation into consideration. However, in the second embodiment, the calculation of the processor 210 further considers the rotation and a displacement in a y direction.

Figure 4:
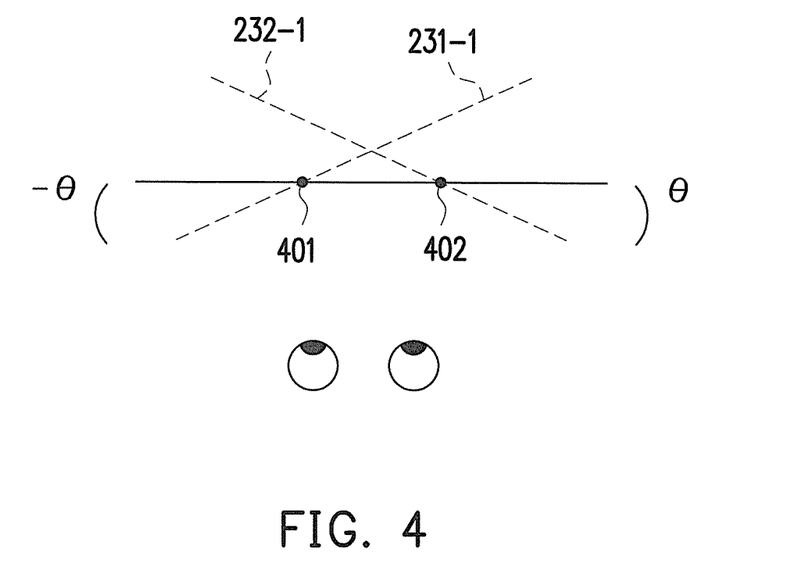
FIG. 4 is a schematic top view illustrating rotated first and second images according to the second embodiment of the invention.
Figure 5:
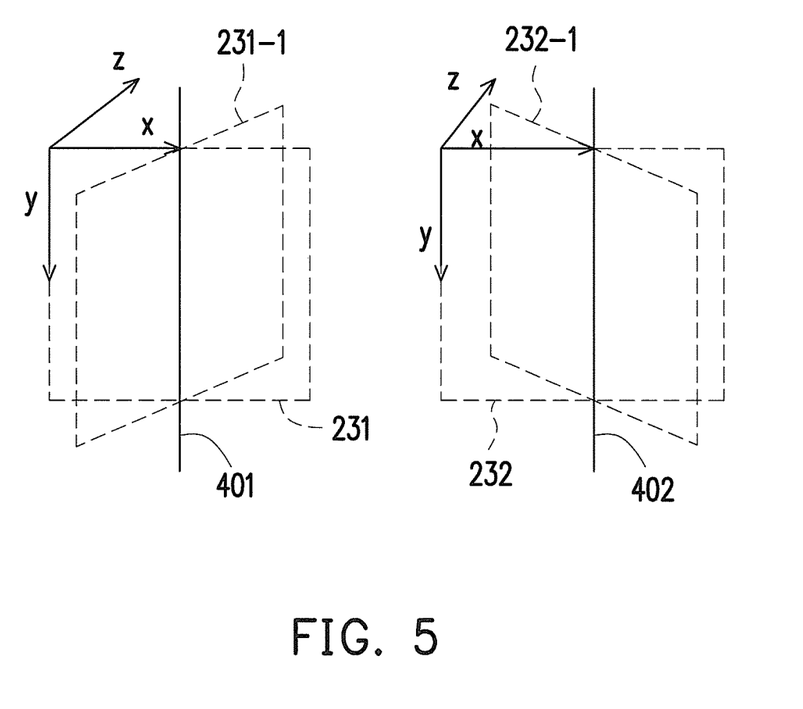
FIG. 5 is a schematic front view illustrating the rotated first and second images according to the second embodiment of the invention.

FIG. 4 is a schematic top view illustrating the rotated first and second images according to the second embodiment of the invention. FIG. 5 is a schematic front view illustrating the rotated first and second images according to the second embodiment of the invention.

Referring to FIG. 4 and FIG. 5, the first image 231 includes an axis 401, and the processor 210 rotates the first image 231 to an angle (–θ) with respect to the axis 401 to generate an adjusted first image 231-1. The second image 232 includes an axis 402, and the processor 210 rotates the second image 232 to an angle (θ) with respect to the axis 402 to generate an adjusted second image 232-1. It should be noted that a rotation angle of the first image is opposite to a rotation angle of the second image. Because the first image 231 and the second image 232 are rotated, the pixels of one layer of the first image 231 and the second image 232 are displaced in the y direction.

Herein, $y_{L,i}$ represents a shift of the $i^{th}$ first layer in the y direction, and $y_{R,i}$ represents a shift of the $i^{th}$ second layer in the y direction. $\theta_i$ represents a rotation angle of the $i^{th}$ second layer. If the axis 401 and the axis 402 are fixed, the displacements of one pixel in the x direction and the y direction can be calculated according to the shift $x_{L,i}$, shift $x_{R,i}$, shift $y_{L,i}$, shift $y_{R,i}$, and the angle $\theta_i$. The transformation (corresponding to "displacement") of the positions of the pixels of the first and the second images may be represented by functions $T_L^x$, $T_L^y$, $T_R^x$, and $T_R^y$. These functions are used for transforming a two-dimensional position to another two-dimensional position. Here $p_{L,i,j}$ represents a position of a $j^{th}$ pixel of the $i^{th}$ first layer (including an x coordinate and a y coordinate), and $p_{R,i,j}$ represents a position of a $j^{th}$ pixel of the $i^{th}$ second layer. Therefore, $T_L^x(p_{L,i,j})$ represents a displaced position of the $j^{th}$ pixel of the $i^{th}$ first layer in the x direction; and $T_L^y(p_{L,i,j})$ represents a displaced position of this pixel in the y direction. $T_R^x(p_{R,i,j})$ represents a displaced position of the $j^{th}$ pixel of the $i^{th}$ second layer in the x direction; and $T_R^y(p_{R,i,j})$ represents a displaced position of this pixel in the y direction.

Similar to the first embodiment, the processor 210 generates a first difference according to a displacement of a pixel of the $i^{th}$ first layer in the x direction and a displacement of a pixel of the $i^{th}$ second layer in the x direction, and generates a first cost according to the first difference. However, in the second embodiment, the first difference refers to a difference between a position of the pixel of the $i^{th}$ first layer and a position of the pixel of the $i^{th}$ second layer in the x direction after the pixels are displaced. For example, the first difference may be represented by $t_d = T_L^x(p_{L,i,j}) - T_R^x(p_{R,i,j})$. However, in the second embodiment, the processor 210 increases the first cost if the first difference is smaller than a first predetermined value; and the processor 210 increases the first cost if the first difference is larger than a second predetermined value. Herein, the first predetermined value and the second predetermined value are set according to a screen width. For instance, the first predetermined value is equal to the screen width (with the number of pixels as a unit) multiplied by –3%, and the second predetermined value is equal to the screen width multiplied by 3%. When the first difference is between the first predetermined value and the second predetermined value, the user has better viewing experience. However, the invention is not limited to the above, and in other embodiments, the first predetermined value and the second predetermined value may be obtained by multiplying the screen width by other values.

Herein the first predetermined value is represented by $disp_{min}$ and the second predetermined value is represented by $disp_{max}$, and the first cost may be represented by the following formulas (4)-(6).

$$E_{rcont} = \sum_i (p_{i,j,min}[p_{i,j,min} > 0])^2 + (p_{i,j,max}[p_{i,j,max} > 0])^2 \qquad (4)$$

$$p_{i,j,min} = -t_{d,i,j} + disp_{min} \qquad (5)$$

$$p_{i,j,max} = t_{d,i,j} - disp_{max} \qquad (6)$$

$E_{rcont}$ is the first cost. [x] is a function. When a predicate x is true, [x] is 1.

On the other hand, in the second embodiment, an objective function in the formula (3) may include a third cost, which is rewritten from the constraint of the formula (3). Specifically, the processor 210 obtains a second difference between a shift of an $i+1^{th}$ first layer and a shift of an $i+1^{th}$ second layer in the x direction. Furthermore, the processor 210 generates a third cost according to a difference between the second difference and a difference between a shift of a pixel of the $i^{th}$ first layer and a shift of a pixel of the $i^{th}$ second layer in the x direction. For example, the third cost may be represented by the following formulas (7)-(9).

$$E_{order} = \sum_i (q_i[q_i > 0])^2 \tag{7}$$

$$s_i = x_{L,i} - x_{R,i} \tag{8}$$

$$q_i = s_{i+1} - s_i - \beta \tag{9}$$

Herein $E_{order}$ is the third cost. In an embodiment, the processor 210 may execute an optimization operation according to the first cost, the second cost, and the third cost.

However, in the second embodiment, the processor 210 further generates a fourth cost according to a third difference between a position of a pixel of the $i^{th}$ first layer and a position of a pixel of the $i^{th}$ second layer in the y direction after the pixels are displaced. As an absolute value of the third difference becomes larger, the fourth cost is increased. For example, the fourth cost may be represented by the following formula (10).

$$E_{vertical} = \sum_i ((T_L^y(p_{L,i,j}) - T_R^y(p_{R,i,j}))^2 \tag{10}$$

$E_{vertical}$ is the fourth cost.

Moreover, the processor 210 further generates a fifth cost according to a shift of an $n^{th}$ first layer in the x direction, wherein n is a positive integer. For example, the fifth cost may be represented by the following formula (11).

$$E_{fixed} = (x_{L,n})^2 \tag{11}$$

The meaning of the fifth cost $E_{fixed}$ is to make a shift of a first layer in the x direction approximate to 0, such that the optimization algorithm has only one solution. In an embodiment, the positive integer n is equal to the number N of the first layers. Nevertheless, the invention is not limited thereto, and the positive integer n may be other numbers in other embodiments.

The processor 210 executes an optimization algorithm according to the first cost, the second cost, the third cost, the fourth cost, and the fifth cost. For example, the optimization algorithm may be represented by the following formula (12).

$$\min E_{rcont} + \lambda_1 E_{vertical} + \lambda_2 E_{hole} + \lambda_3 E_{order} + \lambda_4 E_{fixed} \tag{12}$$

Herein, $\lambda 1$, $\lambda 2$, $\lambda 3$, and $\lambda 4$ are real numbers, which may be determined by the user.

After executing the optimization algorithm, the processor 210 obtains the displacements of each pixel of each first layer in the x direction and the y direction. The processor 210 adjusts the positions of the pixels of the first layers according to the displacements in the x direction and the y direction. In addition, the processor 210 also obtains the displacements of each pixel of each second layer in the x direction and the y direction. The processor 210 may adjust the positions of the pixels of the second layers according to these displacements. Accordingly, the processor 210 generates the images 241-242.

However, the images 241-242 may have one or more holes. The processor 210 further executes an inpaint algorithm to remove the holes. However, the invention does not limit what kind of inpaint algorithm is used.

Figure 6:
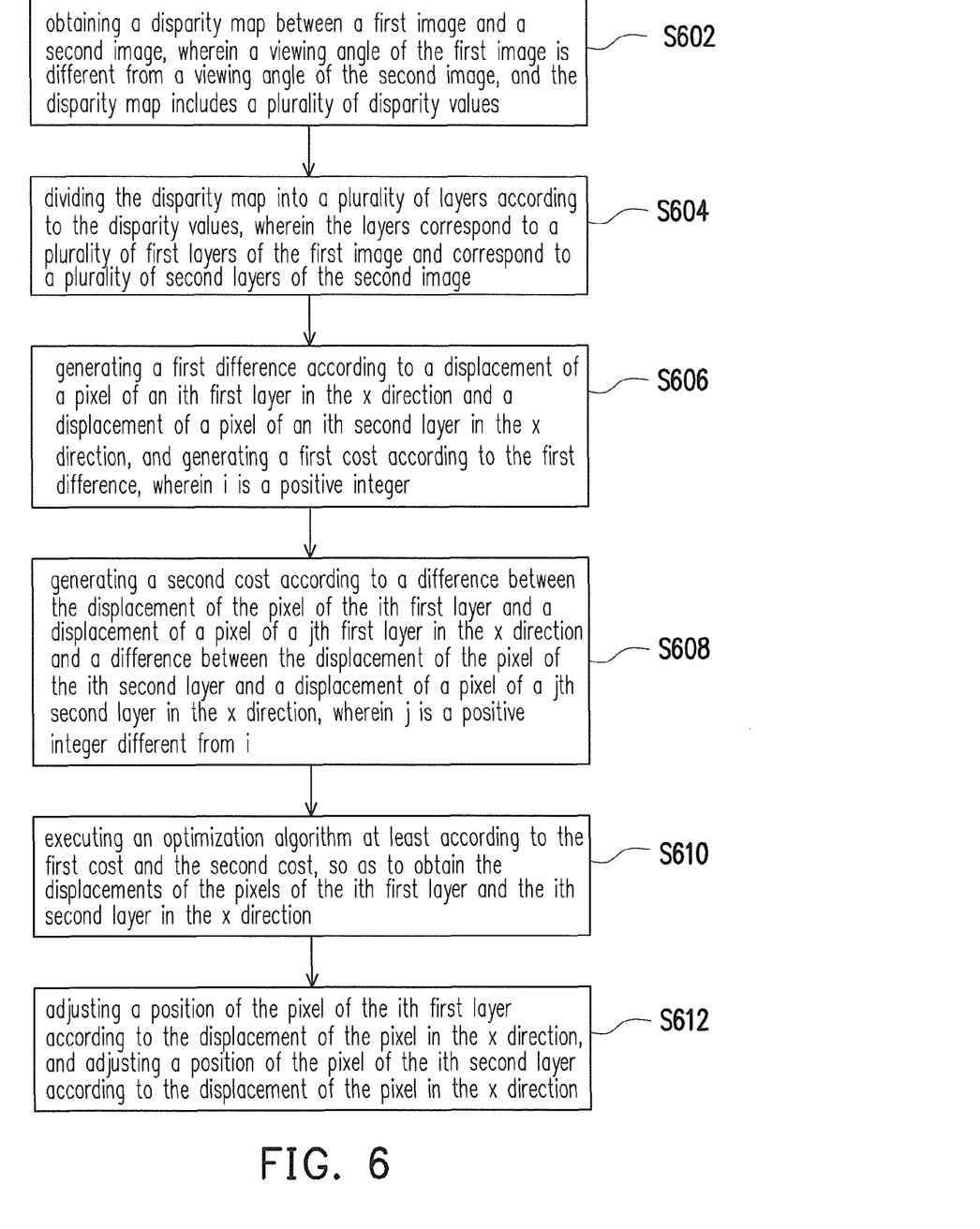
FIG. 6 is a flowchart illustrating a method for adjusting a stereo image according to an embodiment of the invention.

FIG. 6 is a flowchart illustrating a method for adjusting a stereo image according to an embodiment of the invention.

Referring to FIG. 6, in Step S602, a disparity map between a first image and a second image is obtained, wherein a viewing angle of the first image is different from a viewing angle of the second image. Moreover, the disparity map includes a plurality of disparity values.

In Step S604, the disparity map is divided into a plurality of layers according to the disparity values. Herein, the layers correspond to a plurality of first layers of the first image and correspond to a plurality of second layers of the second image.

In Step S606, a first difference is generated according to a displacement of a pixel of an $i^{th}$ first layer in the x direction and a displacement of a pixel of an $i^{th}$ second layer in the x direction, and a first cost is generated according to the first difference. Herein, i is a positive integer.

In Step S608, a second cost is generated according to a difference between the displacement of the pixel of the $i^{th}$ first layer and a displacement of a pixel of a $j^{th}$ first layer in the x direction and a difference between the displacement of the pixel of the $i^{th}$ second layer and a displacement of a pixel of a $j^{th}$ second layer in the x direction. Herein, j is a positive integer different from i.

In Step S610, an optimization algorithm is executed at least according to the first cost and the second cost, so as to obtain the displacements of the pixels of the $i^{th}$ first layer and the $i^{th}$ second layer in the x direction.

In Step S612, a position of the pixel of the $i^{th}$ first layer is adjusted according to the displacement of the pixel in the x direction, and a position of the pixel of the $i^{th}$ second layer is adjusted according to the displacement of the pixel in the x direction.

In an embodiment, the steps of FIG. 6 may be implemented as a module, which may be executed by the processor 210. However, in another embodiment, the steps of FIG. 6 may be implemented as one or more circuits, which may be disposed in an electronic device. The electronic device may be a computer, a server, a distributed system, a television, a smart phone, a tablet computer, or any kind of embedded system.

To conclude the above, the adjusting method and the image processing device disclosed in the embodiments of the invention generate multiple costs according to the displacements of the pixels in the x and the y directions. The costs are based on to execute the optimization algorithm, such that the images after position adjustment have fewer holes, and the obtained three-dimensional image is in a proper area.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An adjusting method for adjusting a stereo image on an image processing device, the adjusting method comprising:
obtaining a disparity map between a first image and a second image, wherein a viewing angle of the first image is different from a viewing angle of the second image, and the disparity map comprises a plurality of disparity values;
dividing the disparity map into a plurality of layers according to the disparity values, wherein the layers correspond to a plurality of first layers of the first image and a plurality of second layers of the second image;

generating a first difference according to a displacement of a pixel of an $i^{th}$ first layer of the first layers in an x direction and a displacement of a pixel of an $i^{th}$ second layer of the second layers in the x direction, and generating a first cost according to the first difference, wherein i is a positive integer;

generating a second cost according to a difference between the displacement of the pixel of the $i^{th}$ first layer in the x direction and a displacement of a pixel of a $j^{th}$ first layer of the first layers in the x direction, and a difference between the displacement of the pixel of the $i^{th}$ second layer in the x direction and a displacement of a pixel of a $j^{th}$ second layer of the second layers in the x direction, wherein j is a positive integer different from i;

executing an optimization algorithm at least according to the first cost and the second cost to obtain the displacement of the pixel of the $i^{th}$ first layer in the x direction and the displacement of the pixel of the $i^{th}$ second layer in the x direction; and adjusting a position of the pixel of the $i^{th}$ first layer according to the displacement of the pixel of the $i^{th}$ first layer in the x direction and adjusting a position of the pixel of the $i^{th}$ second layer according to the displacement of the pixel of the $i^{th}$ second layer in the x direction.

2. The adjusting method according to claim 1, wherein the step of dividing the disparity map into the layers according to the disparity values comprises:

executing a mean-shift algorithm, a normalized cuts algorithm, or a random walker segmentation algorithm according to the disparity values to divide the disparity map into the layers.

3. The adjusting method according to claim 1, wherein the step of dividing the disparity map into the layers according to the disparity values comprises:

dividing the disparity map into the layers according to a plurality of similarities between the disparity values, wherein the similarities are calculated based on two locations of two of the disparity values, neighboring color information of the two locations, or the disparity values corresponding to the two locations.

4. The adjusting method according to claim 1, wherein the first difference is a difference between the displacement of the pixel of the $i^{th}$ first layer in the x direction and the displacement of the pixel of the $i^{th}$ second layer in the x direction, wherein a step of generating the first cost comprises:

generating the first cost according to the first difference, a mean of the disparity values corresponding to the $i^{th}$ first layer, and a mean of the disparity values corresponding to the $i^{th}$ second layer.

5. The adjusting method according to claim 1, wherein the first difference is a difference between a position of the pixel of the $i^{th}$ first layer in the x direction and a position of the pixel of the $i^{th}$ second layer in the x direction after the pixels are displaced, wherein the step of generating the first cost further comprises:

increasing the first cost if the first difference is smaller than a first predetermined value; and increasing the first cost if the first difference is larger than a second predetermined value, wherein the first predetermined value and the second predetermined value are set according to a screen width.

6. The adjusting method according to claim 1, further comprising:

obtaining a second difference between a shift of an $i+1^{th}$ first layer of the first layers in the x direction and a shift of an $i+1^{th}$ second layer of the second layers in the x direction; and generating a third cost according to a difference between the second difference and a difference between a shift of the pixel of the $i^{th}$ first layer in the x direction and a shift of the pixel of the $i^{th}$ second layer in the x direction, wherein the step of executing the optimization algorithm at least according to the first cost and the second cost comprises:

executing the optimization algorithm according to the first cost, the second cost, and the third cost.

7. The adjusting method according to claim 6, further comprising:

generating a fourth cost according to a third difference between a position of the pixel of the $i^{th}$ first layer in the y direction and a position of the pixel of the $i^{th}$ second layer in the y direction after the pixels are displaced.

8. The adjusting method according to claim 7, further comprising:

generating a fifth cost according to a shift of an $n^{th}$ first layer of the first layers, wherein n is a positive integer, wherein the step of executing the optimization algorithm at least according to the first cost and the second cost comprises:

executing the optimization algorithm according to the first cost, the second cost, the third cost, the fourth cost, and the fifth cost, so as to obtain the displacements of the pixel of the $i^{th}$ first layer in the x and the y directions and the displacements of the pixel of the $i^{th}$ second layer in the x and the y directions, and the adjusting method further comprises:

adjusting the position of the pixel of the $i^{th}$ first layer according to the displacement of the pixel of the $i^{th}$ first layer in the y direction, and adjusting the position of the pixel of the $i^{th}$ second layer according to the displacement of the pixel of the $i^{th}$ second layer in the y direction.

9. An image processing device, comprising:

a memory storing a plurality of commands; and a processor coupled to the memory for executing the commands to execute a plurality of steps, comprising:

obtaining a disparity map between a first image and a second image, wherein a viewing angle of the first image is different from a viewing angle of the second image, and the disparity map comprises a plurality of disparity values;

dividing the disparity map into a plurality of layers according to the disparity values, wherein the layers correspond to a plurality of first layers of the first image and a plurality of second layers of the second image;

generating a first difference according to a displacement of a pixel of an $i^{th}$ first layer of the first layers in an x direction and a displacement of a pixel of an $i^{th}$ second layer of the second layers in the x direction, and generating a first cost according to the first difference, wherein i is a positive integer;

generating a second cost according to a difference between the displacement of the pixel of the $i^{th}$ first layer in the x direction and a displacement of a pixel of a $j^{th}$ first layer of the first layers in the x direction, and a difference between the displacement of the pixel of the $i^{th}$ second layer in the x direction and a displacement of a pixel of a $j^{th}$ second layer of the second layers in the x direction, wherein j is a positive integer different from i;

executing an optimization algorithm at least according to the first cost and the second cost to obtain the displacement of the pixel of the $i^{th}$ first layer in the x direction and the displacement of the pixel of the $i^{th}$ second layer in the x direction; and adjusting a position of the pixel of the $i^{th}$ first layer according to the displacement of the pixel of the $i^{th}$ first layer in the x direction and adjusting a position of the pixel of the $i^{th}$ second layer according to the displacement of the pixel of the $i^{th}$ second layer in the x direction.

10. The image processing device according to claim 9, wherein the step of dividing the disparity map into a plurality of layers according to the disparity values comprises:
   executing a mean-shift algorithm, a normalized cuts algorithm, or a random walker segmentation algorithm according to the disparity values to divide the disparity map into the layers.

11. The image processing device according to claim 9, wherein the step of dividing the disparity map into the layers according to the disparity values comprises:
   dividing the disparity map into the layers according to a plurality of similarities between the disparity values, wherein the similarities are calculated based on two locations of two of the disparity values, neighboring color information of the two locations, or the disparity values corresponding to the two locations.

12. The image processing device according to claim 9, wherein the first difference is a difference between the displacement of the pixel of the $i^{th}$ first layer in the x direction and the displacement of the pixel of the $i^{th}$ second layer in the x direction, wherein the step of generating the first cost comprises:
   generating the first cost according to the first difference, a mean of the disparity values corresponding to the $i^{th}$ first layer, and a mean of the disparity values corresponding to the $i^{th}$ second layer.

13. The image processing device according to claim 9, wherein the first difference is a difference between a position of the pixel of the $i^{th}$ first layer in the x direction and a position of the pixel of the $i^{th}$ second layer in the x direction after the pixels are displaced, wherein the step of generating the first cost further comprises:
   increasing the first cost if the first difference is smaller than a first predetermined value; and
   increasing the first cost if the first difference is larger than a second predetermined value, wherein the first predetermined value and the second predetermined value are set according to a screen width.

14. The image processing device according to claim 9, wherein the steps further comprise:
   obtaining a second difference between a shift of an $i+1^{th}$ first layer of the first layers in the x direction and a shift of an $i+1^{th}$ second layer of the second layers in the x direction; and
   generating a third cost according to a difference between the second difference and a difference between a shift of the pixel of the $i^{th}$ first layer in the x direction and a shift of the pixel of the $i^{th}$ second layer in the x direction,
   wherein the step of executing the optimization algorithm at least according to the first cost and the second cost comprises:
   executing the optimization algorithm according to the first cost, the second cost, and the third cost.

15. The image processing device according to claim 14, wherein the steps further comprise:
   generating a fourth cost according to a third difference between a position of the pixel of the $i^{th}$ first layer in the y direction and a position of the pixel of the $i^{th}$ second layer in the y direction after the pixels are displaced.

16. The image processing device according to claim 15, wherein the steps further comprise:
   generating a fifth cost according to a shift of an $n^{th}$ first layer of the first layers, wherein n is a positive integer, and
   wherein the step of executing the optimization algorithm at least according to the first cost and the second cost comprises:
   executing the optimization algorithm according to the first cost, the second cost, the third cost, the fourth cost, and the fifth cost, so as to obtain the displacements of the pixel of the $i^{th}$ first layer in the x and the y directions and the displacements of the pixel of the $i^{th}$ second layer in the x and the y directions, and
   wherein the steps further comprise:
   adjusting the position of the pixel of the $i^{th}$ first layer according to the displacement of the pixel of the $i^{th}$ first layer in the y direction, and adjusting the position of the pixel of the $i^{th}$ second layer according to the displacement of the pixel of the $i^{th}$ second layer in the y direction.

* * * * *